United States Patent [19]

Iwakiri et al.

[11] Patent Number: 5,177,173
[45] Date of Patent: Jan. 5, 1993

[54] HEAT-RESTING AROMATIC POLYESTERSULFONE AND PROCESS FOR PREPARING THE SAME

[75] Inventors: Hiroshi Iwakiri; Masahiro Asada; Kazuya Yonezawa, all of Kobe, Japan

[73] Assignee: Kanegauchi Kagaku Kogyo Kabushiki Kaisha, Japan

[21] Appl. No.: 583,820

[22] Filed: Feb. 27, 1984

[30] Foreign Application Priority Data

Feb. 28, 1983 [JP] Japan ................................. 58-33619

[51] Int. Cl.$^5$ ............................................ C08G 75/20
[52] U.S. Cl. .................................. 528/171; 528/125; 528/126; 528/128; 528/173; 528/191; 528/193; 528/194; 528/294; 528/295; 528/302; 528/308; 528/308.6
[58] Field of Search ............... 528/125, 126, 128, 173, 528/171, 191, 193, 194, 294, 295, 302, 308, 308.6

[56] References Cited

U.S. PATENT DOCUMENTS

| | | | |
|---|---|---|---|
| 3,234,167 | 2/1966 | Sweeny | 528/173 |
| 3,652,499 | 3/1972 | Borman | 528/173 |
| 4,390,682 | 6/1983 | Kyo et al. | 528/173 |
| 4,440,920 | 4/1984 | Fujikake et al. | 528/173 |
| 4,552,947 | 11/1985 | Iwakiri et al. | 528/126 |

FOREIGN PATENT DOCUMENTS 0050821 5/1982 European Pat. Off. .

Primary Examiner—John Kight, III
Assistant Examiner—S. A. Acquah

[57] ABSTRACT

An aromatic polyestersulfone having improved heat resistance, film-forming property, hydrolysis resistance and mechanical strength which comprises 1 to 100% by mole of recurring units of the general formula:

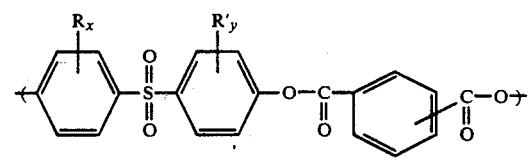

and 99 to 0% by mole of recurring units of the general formula:

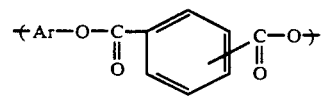

wherein R and R' are the same or different and each is an alkyl or alkoxyl group having 1 to 4 carbon atoms, Ar is a bivalent aromatic group, and x and y are 0 or an integer of 1 to 4 provided that the sum of x and y is from 1 to 8.

14 Claims, 4 Drawing Sheets

HEAT-RESTING AROMATIC POLYESTERSULFONE AND PROCESS FOR PREPARING THE SAME

BACKGROUND OF THE INVENTION

The present invention relates to a novel polyester resin having an excellent heat resistance and a process for the preparation thereof, and more particularly to an aromatic polyestersulfone represented by the formula:

wherein R and R' are the same or different and each is an alkyl or alkoxyl group having 1 to 4 carbon atoms, Ar is a bivalent aromatic group, x and y are 0 or an integer of 1 to 4, but the sum of x and y is from 1 to 8, m is a positive integer and n is 0 or a positive integer.

Aromatic polyesters consisting of aromatic dicarboxylic acids and bivalent phenol compounds have been known for many years. Also, an interfacial polycondensation process, a solution polymerization process, a melt polymerization process and so on have been known as processes for preparing such polyasters. The aromatic polyesters have excellent heat resistance and mechanical property, and are one of useful substances as molding materials. In general, however, the aromatic polyesters have the property that the ester linkage is hydrolyzed, and particularly the alkali resistance is poor. Further, although the aromatic polyesters have an excellent heat resistance, the heat resistance is not always satisfactory in the application to the electric and electronic fields. For instance, the heat resistance in molten solder is not sufficient. Therefore, it has been required to further raise the usable temperature region of the aromatic polyesters.

For this purpose, many attempts have been made with respect to polyesters of 2,2-bis(4-hydroxyphenyl)-propane and terephthaloyl or isophthaloyl chloride or a derivative thereof. The polyesters of this type put on the market are melt-processable, and moreover the moldings obtained therefrom are transparent and have an excellent machanical property. However, the glass transition temperature of these polyesters is about 240° C. (obtained from logarithmic decrement measured by a dynamic viscoelasticity spectrometer) and the heat distortion temperature of the moldings is below 180° C. and, therefore, it has been difficult to use the polyesters in applications requiring heat stability at high temperatures.

It is known that aromatic polyesters obtained by using bis(4-hydroxyphenyl)sulfone (hereinafter referred to as "bisphenol S") as a bisphenol component instead of 2,2-bis(4-hydroxyphenyl)propane have a high glass transition temperature. For instance, a copolymer of bisphenol S and a mixture of terephthaloyl chloride and isophthaloyl chloride in a ratio of 1/1 by weight has a glass transition temperature of 295° C. However, the polyesters obtained from bisphenol S have the drawbacks that the processability in melt molding is very low, that the ester linkage is very easy to be hydrolyzed and the alkali resistance is particularly low, and also that the cast films thereof are fragile and opaque.

SUMMARY OF THE INVENTION

It has now been found that an aromatic polyester containing 1 to 100% by mole of recurring units of the formula (I):

wherein R and R' are the same or different and each is an alkyl or alkoxyl group having 1 to 4 carbon atoms, Ar is a bivalent aromatic group, of which aromatic ring may have a substituent group, and x and y are 0 or an integer of 1 to 4 provided that the sum of x and y is from 1 to 8, has a further improved heat resistance and also has improved film-forming property by casting and hydrolysis resistance.

In accordance with the present invention, there is provided an aromatic polyestersulfone comprising (a) 1 to 100% by mole of units of the formula (I):

and (b) 99 to 0% by mole of units of the formula (II):

wherein R and R' are the same or different and each is an alkyl group having 1 to 4 carbon atoms or an alkoxyl group having 1 to 4 carbon atoms, Ar is a bivalent aromatic group, and x and y are 0 or an integer of 1 to 4 provided that the sum of x and y is from 1 to 8.

DETAILED DESCRIPTION

The aromatic polyesters of the present invention containing as an essential component the units (I) have excellent heat resistance. casting film formability, hydrolysis resistance, particularly alkali hydrolysis resistance, mechanical strength and transparency. Particularly, aromatic polyesters containing the units (I) in which the bisphenol component has substituent groups at the 3 or 5 position of each aromatic ring, namely units of the formula (III):

wherein $R^1$, $R^2$, $R^3$ and $R^4$ are hydrogen atom or an alkyl or alkoxyl group having 1 to 4 carbon atoms, provided that at least one of $R^1$ and $R^2$ and at least one of $R^3$ and $R^4$ are not hydrogen atom, are remarkable in improvement of the above-mentioned properties.

Among them, the aromatic polyesters containing the units (I) in which the bisphenol component has $CH_3$ groups at all of the 3 and 5 positions of the aromatic rings, namely units of the formula (IV):

are particularly useful in points of hydrolysis resistance and alkali resistance, and are also advantageous in that the bisphenol used as a raw material is easily obtainable.

The polyesters of the present invention have a high glass transition temperature (Tg). For instance, the glass transition temperature of the polyesters of the present invention is higher than that of a commercially available polyester prepared by using 2,2-bis(4-hydroxyphenyl)propane as a phenol component by 85° to 100° C., and is higher than that of a polyester prepared by using bisphenol S which has no substituent group on the aromatic rings, by 35° to 45° C. The films of the polyesters obtained by a casting method have a very good transparency. For instance, the absorbance of the film having a thickness of 100 μm. is not more than 0.05 with respect to all wavelengths in the visible ray region. Also, the films have a good toughness and show a high tensile strength. Further, the hydrolysis resistance, particularly alkali hydrolysis resistance, is remarkably improved as compared with a polyester prepared from bisphenol S. For instance, the weight decrease of a polyester prepared from bis(4-hydroxy-3,5-dimethylphenyl)-sulfone according to the present invention after treatment in a 10% by weight aqueous solution of caustic soda at 100° C. for 1 hour is only 3 to 5% by weight, whereas a polyester prepared from bisphenol S is hydrolyzed and completely dissolved.

The aromatic polyesters of the present invention can contain units of the following formula (II) in an arbitrary proportion within the range of 0 to 99% by mole:

wherein Ar is a bivalent aromatic group.

Preferable units (II) are a unit of the formula (V):

wherein R″ and R‴ are the same or different and each is an alkyl group having 1 to 4 carbon atoms, an alkoxyl group having 1 to 4 carbon atoms, an aryl group having 6 to 10 carbon atoms, a cycloalkyl group having 5 to 10 carbon atoms, chlorine atom or bromine atom, p and q are 0 or an integer of 1 to 4, X is a bivalent group selected from the group consisting of an alkylidene group having 1 to 8 carbon atoms, a cycloalkylidene group having 1 to 8 carbon atoms, —O—, —S—, and —CO—, and a is 0 or 1, and a unit of the formula (VI):

Introduction of the recurring units (I) into a polyester having a structure shown by the units (II) raises the glass transition temperature. The polyesters of the present invention can contain the recurring units (I) in an arbitrary proportion within the range of 1 to 100% by mole, but when the heat resistance is desired, it is preferable to contain 30 to 100% by mole of the units (I). The melt moldability of the polyesters can be improved by the introduction of the units (II). Also, the introduction of the units (II) having a substituent group at the o-positions to hydroxyl group of the aromatic ring of the difunctional phenol component improves the hydrolysis resistance.

The polyesters of the present invention is prepared by polycondensation of one or more difunctional phenol compounds with one or more dicarboxylic acids. In the present invention, it is essential to employ bis(4-hydroxyphenyl)sulfone derivatives having at least one substituent group on the aromatic ring as a difunctional phenol compound for producing the recurring units (I).

The bis(4-hydroxyphenyl)sulfone derivatives used in the present invention are compounds shown by the general formula (A):

wherein R, R′, x and y are as defined above, preferably compounds having at least one substituent group at the 3 or 5 position of each of the aromatic rings, shown by the following formula (A′):

(A')

wherein $R^1$, $R^2$, $R^3$ and $R^4$ are as defined above.

Typical examples of the bis(4-hydroxyphenyl)-sulfone derivatives (A) are, for instance, bis(4-hydroxy-3-methylphenyl)sulfone, bis(4-hydroxy-3,5-dimethylphenyl)- sulfone, bis(4-hydroxy-3-ethylphenyl)sulfone, bis(4-hydroxy-3,5-diethylphenyl)sulfone, bis(4-hydroxy-3,5-dimethoxyphenyl)sulfone, bis(4-hydroxy-3,5-diethoxyphenyl)sulfone, and the like. Particularly, bis(4-hydroxy-3,5-dimethylphenyl)sulfone is a useful compound also from the viewpoint of easiness to obtain.

The above compounds (A) can be employed alone or in admixture thereof, or in combination with difunctional phenol compounds of the following formula (B) in an arbitrary proportion:

HO—Ar—OH     (B)

wherein Ar is as defined above.

Preferable difunctional phenol compounds (B) used in the present invention are compounds of the following formula (C):

(C)

wherein R", R''', p, q, X and a are as defined above, and monocyclic difunctional phenol compounds.

Typical examples of the difunctional phenol compounds (C) are, for instance, bis(4-hydroxyphenyl)-methane, bis(4-hydroxy-3-methylphenyl)methane, bis(4-hydroxy-3,5-dimethylphenyl)methane, bis(4-hydroxy-3,5-dichlorophenyl)methane, bis(4-hydroxy-3,5-dibromophenyl)-methane, bis(4-hydroxy-3,5-dimethoxyphenyl)methane, bis(4-hydroxyphenyl)ketone, bis(4-hydroxy-3,5-dimethylphenyl)-ketone, bis(4-hydroxyphenyl)sulfide, 4,4'-dihydroxy-diphenyl ether, 1,1-bis(4-hydroxyphenyl)ethane, 1,1-bis(4-hydroxy-3,5-dimethylphenyl)ethane, 2,2-bis(4-hydroxyphenyl)propane, 2,2-bis(4-hydroxy-3-methylphenyl)-propane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)cyclohexane, 4,4'-dihydroxybiphenyl, 4,4'-dihydroxy-3,3',5,5'-tetramethylbiphenyl, and the like. The monocyclic difunctional phenol compounds include, for instance, hydroquinone and resorcinol. The diphenol compounds (B) may be employed alone or in admixture thereof.

Preferable dicarboxylic acid dihalides used in the present invention are terephthaloyl dichloride, isophthaloyl dichloride and a mixture thereof.

The difunctional phenol compounds to be reacted with the dicarboxylic acids are employed so that the total molar amount is substantially equal to that of the dicarboxylic acids.

The aromatic polyesters of the present invention can be easily prepared by employing a phase transfer catalyst. That is to say, the aromatic polyesters are prepared by reacting an alkali metal salt of the difunctional phenol compound, namely the compound (A) alone or a difunctional phenol mixture containing at least 1% by mole of the compound (A), with the dicarboxylic acid dihalide in the presence of a phase transfer catalyst. For instance, a difunctional phenol compound is added to an aqueous solution of a hydroxide of an alkali metal such as potassium or sodium and is reacted with the alkali metal hydroxide to form an aqueous solution of an alkali metal salt of the difunctional phenol compound. To the aqueous solution of the alkali metal salt of the difunctional phenol compound is added a solution of a dicarboxylic acid dihalide in an organic solvent which is substantially immiscible with water, and they are reacted in the presence of a phase transfer catalyst. The concentration of the aqueous solution of the alkali metal salt of the difunctional phenol compound is not particularly limited, and the aqueous solution can be employed in arbitrary concentrations.

In the polycondensation reaction using a phase transfer catalyst, an operation for removing a salt is unnecessary or easy, since water is used as one of the reaction solvents. Also, lowering of the reaction temperature and shortening of the reaction time can be attained as compared with conventional melt polymerization process and solution polymerization process. Further, it is possible to employ inexpensive general organic solvents.

Tyical examples of the organic solvent are halogenated hydrocarbons such as methylene chloride and chloroform, halogenated aromatic hydrocarbons such as o-dichlorobenzene, and aromatic hydrocarbons such as toluene and xylene. The organic solvents may be employed alone or in admixture thereof. Particularly, in case of employing terephthaloyl chloride and/or isophthaloyl chloride as dicarboxylic acid dihalides, it is convenient to employ them in the form of a solution in the above-mentioned organic solvents. Although the concentration of the organic solvent solution is not particularly limited, it is usually selected from 2 to 30% by weight.

Examples of the phase transfer catalyst used in the present invention are, for instance, quaternary ammonium salts such as trioctylmethylammonium chloride and benzyltributylammonium chloride, quaternary phosphonium salts such as tetrabutylphosphonium bromide and phenyltributylphosphonium bromide, and crown ethers such as 18-crown-6 and dicyclohexyl-18-crown-6. These catalysts are employed in an amount of 0.1 to 20% by mole, preferably 1 to 10% by mole, based on the total of the whole phenol compounds.

The polymerization reaction using the phase transfer catalyst is carried out at a temperature of 0° to 50° C. In general, the reaction for 1 to 5 hours is sufficient.

A monofunctional phenol compound such as p-t-butylphenol or p-methoxyphenol and a monofunctional acid chloride such as benzoyl chloride may be employed in order to adjust the molecular weight of the product. The use of large amounts of these monofunctional compounds results in large lowering of the molecular weight. Therefore, in case of employing these monofunctional compounds, they are employed preferably in an amount of not more than 5% by mole based on the difunctional compounds. When the molecular weight of the aromatic polyester is too low, the mechanical strength of films, sheets or other moldings prepared from the polyester becomes insufficient. Therefore, it is desirable that the reduced viscosity of the aromatic polyester is not less than 0.1 dl./g. (measured at 23° C. in a concentration of 0.32 g./dl. in a phenol/1,1,2,2-tetrachloroethane mixed solvent of 1/1 by weight), especially 0.1 to 8.0 dl./g., more especially 0.3 to 8.0 dl./g.

A small amount of an anitoxidant, an age resistor or a light stabilizer may be added to the aromatic polyesters of the present invention in order to improve the heat resistance, weatherability and oxidation resistance. When the flame resistance is desired, known flame retarders may be added to the polyesters of the invention. Also, it is possible to reinforce the polyesters by means of a glass fiber, a glass mat and so on.

The aromatic polyesters of the present invention are useful as a molding material, and in particular, the films and sheets thereof have excellent heat resistance, mechanical strength and transparency. The films and sheets can be prepared by a known method such as casting. The mechanical strength of the films and sheets is further improved by stretching them. The films and sheets are applicable to uses in the electric and electronic fields because of excellent heat resistance, and also applicable to the optical uses because of excellent transparency as well as heat resistance. It is also possible to produce fibers from the polyesters of the invention by a solution method, and the fibers can be drawn to increase the mechanical strength.

The present invention is more specifically described and explained by means of the following Examples. It is to be understood that the present invention is not limited to the Examples, and various changes and modifications may be made in the invention without departing from the spirit and scope thereof.

In the following Examples, the reduced viscosity $\eta sp/c$ is a value obtained by measurement under conditions: phenol/1,1,2,2-tetrachloroethane mixed solvent (1/1 by weight), temperature 32° C. and concentration 0.32 g./dl.

EXAMPLE 1

Figure 1:
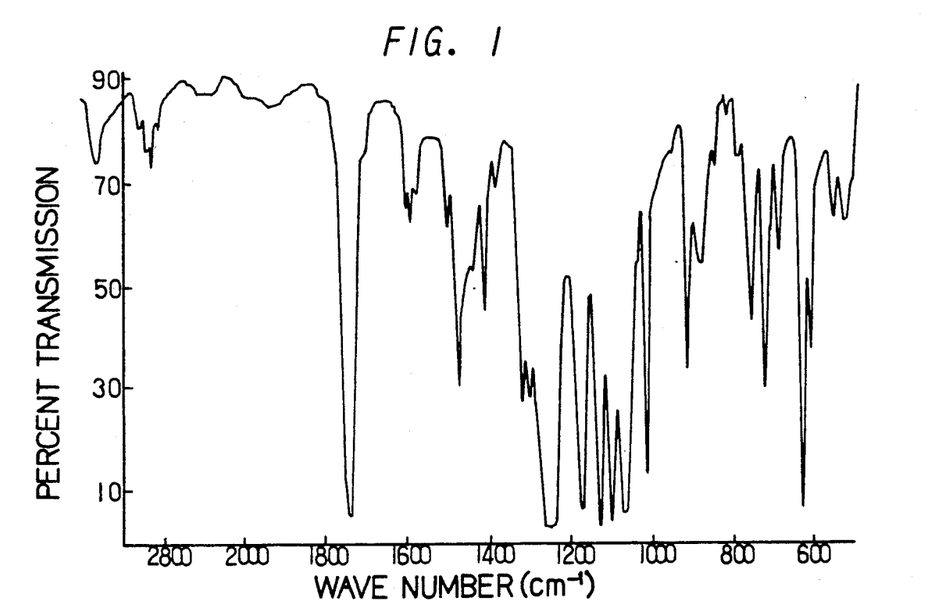
FIGS. 1 to 6 are infrared absorption spectrums of the aromatic polyestersulfones of the present invention.

In 250 ml. of a 1N aqueous solution of sodium hydroxide were dissloved 30.64 g. (100 millimoles) of bis(4-hydroxy-3,5-dimethylphenyl)sulfone and 1.58 g. (10 millimoles) of sodium thiosulfate in a nitrogen stream. In 500 ml. of methylene chloride were dissolved 20.30 g. (100 millimoles) of terephthaloyl dichloride and 0.80 g. (2 millimoles) of trioctylmethylammonium chloride. The methylene chloride solution was added to the aqueous solution on an ice bath, and agitated for 45 minutes. To the reaction mixture was added 2 ml. of benzoyl chloride, and the agitation was further continued for 15 minutes on the ice bath. The methylene chloride layer was then washed with water 4 times, and was poured to an excess of acetone to precipitate a white polymer. The polymer was filtered off and dried. The weight yield was 43.65 g. and the percent yield was 94%. The polymer had a reduced viscosity of 4.02 dl./g. The infrared absorption spectrum of the obtained polymer is shown in FIG. 1.

In 190 g. of a phenol/1,1,2,2-tetrachloroethane mixed solvent (1:1 by weight) was dissolved 10 g. of the polymer. The solution was cast on a glass plate, and the solvent was removed by heating at 80° C. for 60 minutes, at 100° C. for 30 minutes and then at 150° C. for 15 minutes and by further drying under reduced pressure to form a film having a thickness of about 100 μm. The absorbance A of the film (A=log Io/I wherein Io is the intensity of a monochromatic light before transmission, and I is the intensity of the light after transmission through a substance layer) to visible rays of 400 to 900 nm. is from 0.04 to 0.06.

EXAMPLE 2

The procedure of Example 1 was repeated except that a mixture of 15.62 g. (50 millimoles) of bis(4-hydroxy-3,5-dimethylphenyl)sulfone and 11.42 g. (50 millimoles) of 2,2-bis(4-hydroxyphenyl)propane was employed as a difunctional phenol component, to give 39.75 g. of a white polymer. The yield was 96%. The polymer had a reduced viscosity of 2.84 dl./g.

Figure 2:
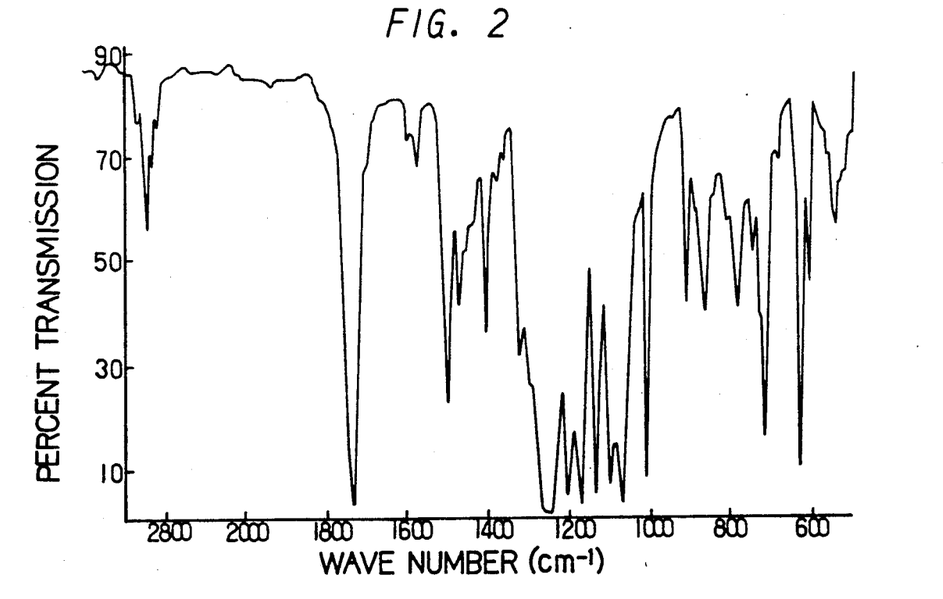

The infrared absorption spectrum of the obtained polymer is shown in FIG. 2.

EXAMPLE 3

Figure 3:
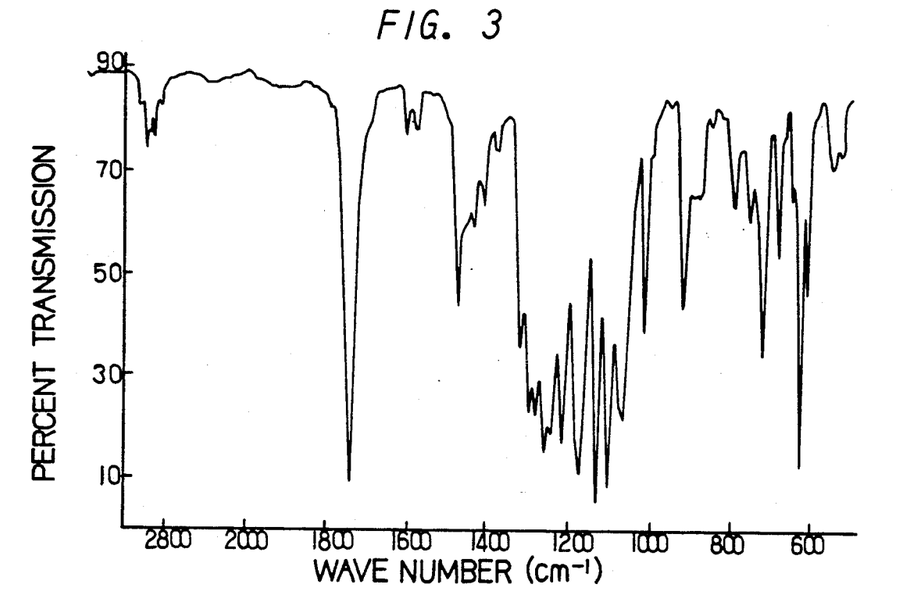

The procedure of Example 1 was repeated except that a mixture of 10.15 g. (50 millimoles) of terephthaloyl dichloride and 10.15 g. (50 millimoles) of isophthaloyl dichloride was employed as a dicarboxylic acid component, to give 35.19 g. of a white polymer. The yield was 81%. The polymer has a reduced viscosity of 4.76 dl./g. The infrared absorption spectrum of the obtained polymer is shown in FIG. 3.

In 190 g. of 1,1,2,2-tetrachloroethane was dissolved 10 g. of the above polymer. The resulting solution was cast on a glass plate, and the solvent was removed by heating at 80° C. for 60 minutes, at 100° C. for 30 minutes and then at 150° C. for 15 minutes and further by drying under reduced pressure to form a film having a thickness of about 80 μm. The absorbance of the film to visible rays of 400 to 900 nm. was from 0.04 to 0.05.

EXAMPLE 4

In 100 ml. of a 1N aqueous solution of sodium hydroxide were dissolved 6.13 g. (20 millimoles) of bis(4-hydroxy-3,5-dimethylphenyl)sulfone, 5.13 g. (20 millimoles) of bis(4-hydroxy-3,5-dimethylphenyl)methane and 0.64 g. (4 millimoles) of sodium thiosulfate in a nitrogen stream.

In 200 ml. of methylene chloride were dissolved 8.12 g. (40 millimoles) of terephthaloyl dichloride and 0.32 g. (0.8 millimole) of trioctylmethylammonium chloride. The methylene chloride solution was added to the above aqueous solution on an ice bath, and agitated for 45 minutes. To the reaction mixture was added 0.5 ml. of benzoyl chloride, and the agitation was further continued for 15 minutes on the ice bath. The methylene chloride layer was then washed with water 4 times, and was poured to excess acetone to precipitate a white polymer. The polymer was isolated by filtration and dried. The weight yield of the polymer was 14.80 g. The polymer had a reduced viscosity of 3.10 dl./g.

Figure 4:
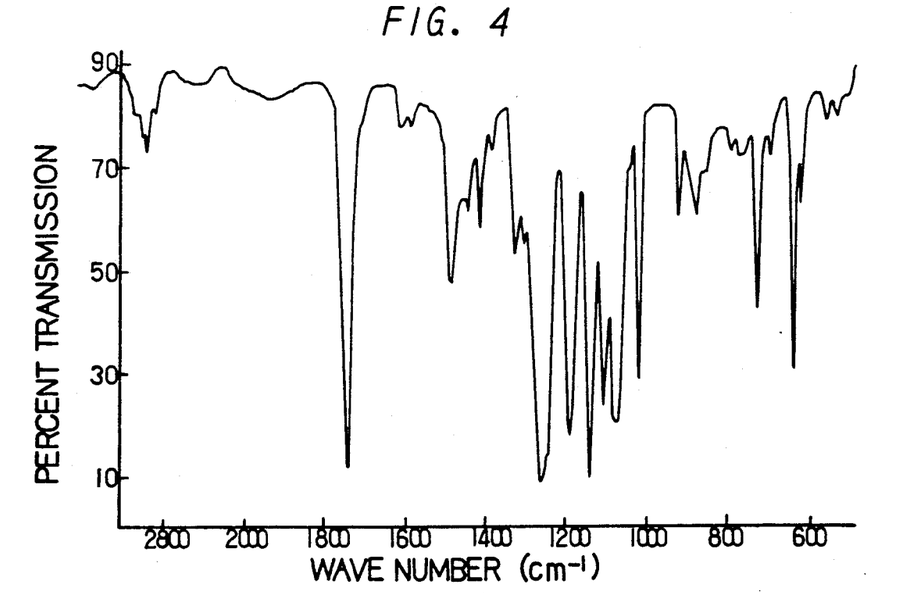

The infrared absorption spectrum of the obtained polymer is shown in FIG. 4.

EXAMPLE 5

The procedure of Example 4 was repeated except that 4.85 g. (20 millimoles) of 4,4'-dihydroxy-3,3',5,5'-tetramethylbiphenyl was employed instead of bis(4hydroxy-3,5-dimethylphenyl)methane, to give 16.18 g. of a white polymer. The yield was 100%. The polymer had a reduced viscosity of 7.29 dl./g.

Figure 5:
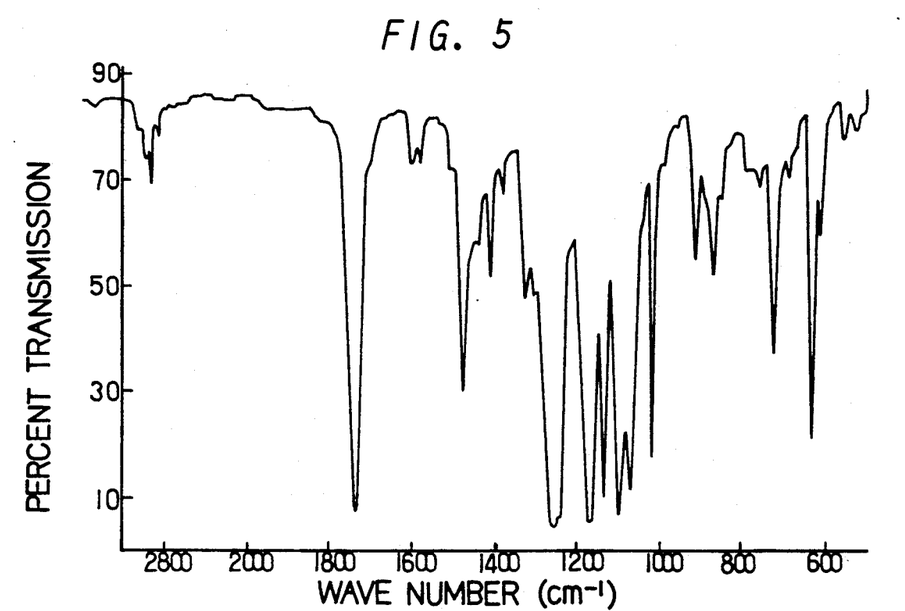

The infrared absorption spectrum of the obtained polymer is shown in FIG. 5.

EXAMPLE 6

In 125 ml. of a 1N aqueous solution of sodium hydroxide were dissolved 7.66 g. (25 millimoles) of bis(4-hydroxy-3,5-dimethylphenyl)sulfone, 6.06 g. (25 millimoles) of 4,4'-dihydroxy-3,3',5,5'-tetramethylbiphenyl and 0.79 g. (5 millimoles) of sodium thiosulfate in a nitrogen stream.

In 250 ml. of methylene chloride were dissolved 5.08 g. (25 millimoles) of terephthaloyl dichloride, 5.08 g. (25 millimoles) of isophthaloyl dichloride and 0.40 g. (1.0 millimole) of trioctylmethylammonium chloride. The methylene chloride solution was added to the above aqueous solution on an ice bath, and was agitated for 45 minutes. To the reaction mixture was added 0.5 ml. of benzoyl chloride, and the agitation was further continued for 15 minutes on the ice bath. The methylene chloride layer was then washed with water 4 times, and was poured to excess acetone to precipitate a polymer. The polymer was filtered off and dried. The weight yield was 19.35 g. and the percent yield was 96%. The polymer had a reduced viscosity of 2.51 dl./g.

Figure 6:
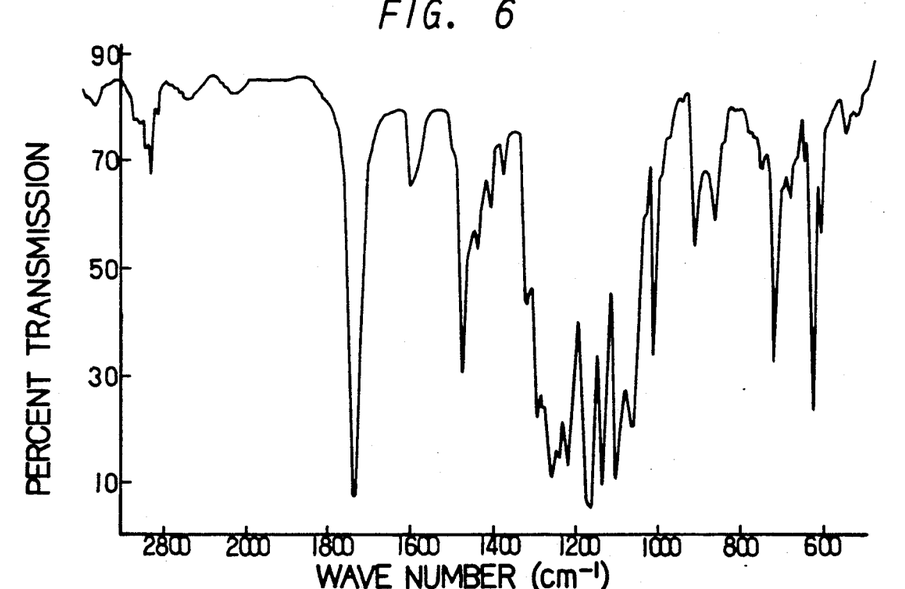

The infrared absorption spectrum of the obtained polymer is shown in FIG. 6.

COMPARATIVE EXAMPLE 1

In 500 ml. of a 1N aqueous solution of sodium hydroxide were dissolved 45.20 g. (198 millimoles) of 2,2-bis(4-hydroxyphenyl)propane, 0.60 g. (4 millimoles) of p-t-butylphenol and 3.16 g. (20 millimoles) of sodium thiosulfate in a nitrogen stream.

In 1 liter of methylene chloride were dissolved 20.30 g. (100 millimoles) of terephthaloyl dichloride, 20.30 g. (100 millimoles) of isophthaloyl dichloride and 1.61 g. (4 millimoles) of trioctylmethylammonium chloride. The methylene chloride solution was added to the above aqueous solution on an ice bath, and was agitated for 45 minutes. To the reaction mixture was added 4 ml. of benzoyl chloride, and the agitation was further continued for 15 minutes on the ice bath. Thereafter, the reaction mixture was treated in the same manner as in Example 1 to give 70.33 g. of a white polymer. The yield was 98%, and the polymer had a reduced viscosity of 1.44 dl./g.

COMPARATIVE EXAMPLE 2

In 25 ml. of a 1N aqueous solution of sodium hydroxide were dissolved 12.51 g. (50 millimoles) of bis(4-hydroxyphenyl)sulfone and 0.79 g. (5 millimoles) of sodium thiosulfate in a nitrogen stream.

In 250 ml. of methylene chloride were dissolved 10.15 g. (50 millimoles) of terephthaloyl dichloride and 0.40 g. (1.0 millimole) of trioctylmethylammonium chloride. The obtained methylene chloride solution was added to the above aqueous solution on an ice bath. Simultaneously with the addition, a white powder precipitated. The mixture was agitated at that temperature for 45 minutes. To the reaction mixture was added 1 ml. of benzoyl chloride, and the agitation was further continued for 15 minutes on the ice bath. The methylene chloride layer was then washed with water 4 times, and was poured to acetone with agitation. The white powder was filtered off and dried. The amount of the obtained powder was 17.90 g. The powder was insoluble in a phenol/1,1,2,2-tetrachloroethane mixed solvent, and accordingly, it was impossible to measure the viscosity. The yield of the product assumed as a polymer was 95%.

COMPARATIVE EXAMPLE 3

In 250 ml. of a 1N aqueous solution of sodium hydroxide were dissolved 25.03 g. (100 millimoles) of bis(4-hydroxyphenyl)sulfone and 1.58 g. (10 millimoles) of sodium thiosulfate in a nitrogen stream.

Figure 7:
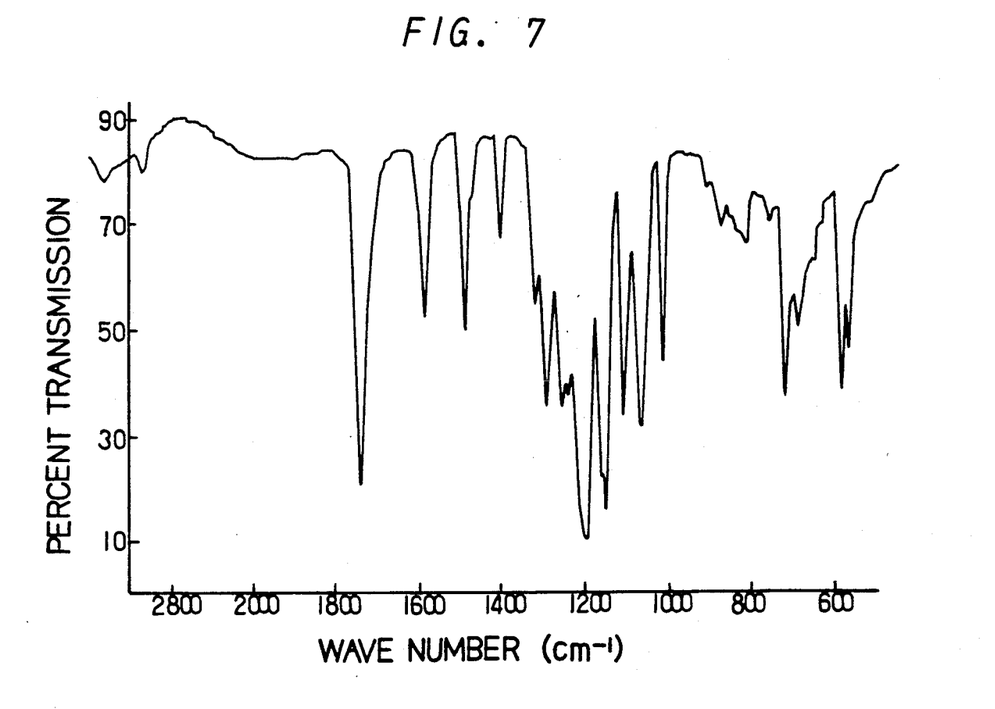
FIG. 7 is an infrared absorption spectrum of a conventional polyestersulfone obtained by using bis(4-hydroxyphenyl)sulfone.

In 500 ml. of methylene chloride were dissolved 10.15 g. (50 millimoles) of terephthaloyl dichloride, 10.15 g. (50 millimoles) of isophthaloyl dichloride and 0.81 g. (2.0 millimoles) of trioctylmethylammonium chloride. The obtained methylene chloride solution was added to the above aqueous solution on an ice bath, and was agitated for 45 minutes. During the reaction, the methylene chloride layer gelled and swelled. To the reaction mixture was added 2 ml. of benzoyl chloride, and the agitation was further continued for 15 minutes on the ice bath. The gelled methylene chloride layer was then washed with water 4 times, and poured into acetone with agitation. The resulting precipitate was filtered off and dried to give 36.08 g. of a white polymer. The reduced viscosity of the polymer was 0.99 dl./g., and the yield was 96%. The infrared absorption spectrum of the obtained polymer is shown in FIG. 7.

In 90 g. of a phenol/1,1,2,2-tetrachloroethane mixed solvent (1/1 by weight) was dissolved 10 g. of the obtained polymer. A film was prepared from the polymer solution in the same manner as in Example 1, but a white fragile film was only obtained.

EXAMPLE 7

Each of the polymers obtained in Examples 1, 2, 4 and 6 and Comparative Example 3 was dissolved in a phenol/1,1,2,2-tetrachloroethane mixed solvent (1/1 by weight) in a concentration of 5 to 10% by weight. The obtained solution was cast on a glass plate, and the solvent was removed by heating at 80° C. for 60 minutes, at 100° C. for 30 minutes and then at 150° C. for 15 minutes and further by drying under reduced pressure to give films having a thickness of 60 to 100 μm. With respect to the polymers obtained in Example 3 and Comparative Example 1, films having a thickness of 60 to 100 μm. were prepared in the same manner as above except that 1,1,2,2-tetrachloroethane was employed as a solvent. Tensile strength and elongation at breaking of the obtained films were measured.

The results are shown in Table 1.

TABLE 1

|  | Tensile strength (kg./cm².) | Elongation (%) |
| --- | --- | --- |
| Ex. 1 | 922 | 15 |
| Ex. 2 | 981 | 11 |
| Ex. 3 | 972 | 13 |
| Ex. 4 | 837 | 12 |
| Ex. 6 | 716 | 6 |
| Com. Ex. 1 | 757 | 10 |
| Com. Ex. 3 | breaking | — |

The glass transition temperature of the polymers obtained in Examples 1 to 4 and 6 and Comparative Examples 1 and 3 was measured according to a TBA (torsion braid analysis) method by employing a dynamic viscoelasticity spectrometer made by RHESCA CO. The samples were obtained by preparing 5 to 10% by weight solutions of the polymers in the same manner as above, impregnating glass braids with the solutions and drying them.

The glass transition temperature (Tg) obtained from logarithmic decrement ($\alpha_T$) and shear modulus (G) are shown in Table 2.

TABLE 2

| | Glass transition temperature (°C.) | |
|---|---|---|
| | $\alpha_T$ | G |
| Ex. 1 | 342 | 331 |
| Ex. 2 | 324 | 314 |
| Ex. 3 | 330 | 320 |
| Ex. 4 | 335 | 316 |
| Ex. 6 | 327 | 316 |
| Com. Ex. 1 | 246 | 236 |
| Com. Ex. 3 | 296 | 274 |

The hydrolysis resistance and alkali hydrolysis resistance tests were made by employing the films obtained in the above. The films were immersed in water at 100° C. for 30 hours and in a 10% by weight aqueous solution of sodium hydroxide at 100° C. for 5 hours, respectively, and the weight decreases of the films were measured.

The results are shown in Table 3.

TABLE 3

| | Weight decrease (%) | |
|---|---|---|
| | 10% aqueous NaOH soln., 100°C., 5 hrs. | water, 100° C., 30 hrs. |
| Ex. 1 | 16 | 2.48 |
| Com. Ex. 1 | 25 | 3.85 |
| Com. Ex. 3 | completely dissolved in 1 hour | film was fragile and broke into fragments |

In addition to the ingredients used in the Examples, other ingredients can be used in the Examples as set forth in the specification to obtain substantially the same results.

What we claim is:

1. An aromatic polyestersulfone consisting essentially of (a) 30 to 100% by mole of units of the formula:

and (b) 70 to 0% by mole of units of the formula:

wherein a is 0 or 1, and X is a bivalent group selected from the group consisting of an alkylidene group having 1 to 8 carbon atoms, a cycloalkylidene group having 1 to 8 carbon atoms, —O—, —S— and —CO—.

2. The polyestersulfone of claim 1, wherein a is 1 and X is an alkylidene group having 1 to 8 carbon atoms.

3. The polyestersulfone of claim 1, wherein a is 1 and X in —CH₂—.

4. The polyestersulfone of claim 1, wherein a is 0.

5. An aromatic polyestersulfone consisting essentially of units of the formula:

6. A process of preparing a heat-resisting aromatic polyestersulfone which comprises reacting an alkali metal salt of a difunctional phenol compound with a substantially equimolar amount of terephthaloyl dichloride, isophthaloyl dichloride or a mixture thereof in the presence of a phase transfer agent, said difunctional phenol compound being a mixture consisting essentially of 30 to 100% by mole of bis(4-hydroxy-3,5-dimethylphenyl)sulfone and 70 to 0% by mole of a substituted phenol compound of the formula:

wherein a is 0 or 1, and X is a bivalent group selected from the group consisting of an alkylidene group having 1 to 8 carbon atoms, a cycloalkylidene group having 1 to 8 carbon atoms, —O—, —S— and 13 CO—.

7. The process of claim 6, wherein a is 1 and X is —CH₂—.

8. The process of claim 6, wherein a is 0.

9. The process of claim 6, wherein said difunctional phenol compound consists essentially of bis(4-hydroxy-3,5-dimethylphenyl)sulfone.

10. A film or sheet of an aromatic polyestersulfone consisting essentially of (a) 30 to 100% by mole of units of the formula:

and (b) 70 to 0% by mole of units of the formula:

wherein a is 0 or 1, and X is a bivalent group selected from the group consisting of an alkyliden group having 1 to 8 carbon atoms, a cycloalkylidene group having 1 to 8 carbon atoms, —O—, —S—.

11. The film or sheet of claim 10, wherein a is 1 and X is an alkylidene group having 1 to 8 carbon atoms.

12. The film or sheet of claim 10, wherein a is 1 and X is —CH$_2$—.

13. The film or sheet of claim 10, wherein a is 0.

14. A film or sheet of an aromatic polyestersulfone consisting essentially of units of the formula:

* * * * *

UNITED STATES PATENT AND TRADEMARK OFFICE
CERTIFICATE OF CORRECTION

PATENT NO.   : 5,177,173
DATED        : January 5, 1993
INVENTOR(S)  : IWAKIRI, et al It is certified that error appears in the above-identified patent and that said Letters Patent is hereby corrected as shown below:

On the Title Page, left-hand column

"[73] Assignee:   Kanegauchi Kagaku Kogyo Kabushiki Kaisha, Japan"

should read

--[73] Assignee:   Kanegafuchi Kagaku Kogyo Kabushiki Kaisha, Japan--

Signed and Sealed this

Seventh Day of December, 1993

Attest:

BRUCE LEHMAN

Attesting Officer

Commissioner of Patents and Trademarks